United States Patent
Pedersen et al.

(10) Patent No.: US 9,360,928 B2
(45) Date of Patent: Jun. 7, 2016

(54) DUAL REGULATOR SYSTEMS

(75) Inventors: Frode Milch Pedersen, Trondheim (NO); Patrice Menard, Saint-Mars-Du-Desert (FR); Mickael Le Dily, Carquefou (FR); Thierry Gourbilleau, Le Loroux-Bottereau (FR); Stefan Schabel, Syrgenstein (DE)

(73) Assignee: Atmel Corporation, San Jose, CA (US)

( * ) Notice: Subject to any disclaimer, the term of this patent is extended or adjusted under 35 U.S.C. 154(b) by 234 days.

(21) Appl. No.: 13/587,525

(22) Filed: Aug. 16, 2012

(65) Prior Publication Data

US 2014/0028278 A1 Jan. 30, 2014

Related U.S. Application Data

(60) Provisional application No. 61/676,710, filed on Jul. 27, 2012.

(51) Int. Cl.
*G05F 1/00* (2006.01)
*G06F 1/32* (2006.01)

(52) U.S. Cl.
CPC ........... *G06F 1/3296* (2013.01); *Y02B 60/1285* (2013.01)

(58) Field of Classification Search
CPC ... H02M 3/156; H02M 3/1563; H02M 3/157; H02M 3/158; H02M 3/1584; H02M 2001/0032; H02M 2001/0035; H02M 2001/0067; H02M 2001/007; H02M 2001/0074; H02M 2001/0077; H02M 2001/008; H02M 1/32; G06F 1/32; G06F 1/3203; G06F 1/3206; G06F 1/3234; G06F 1/3287; G06F 1/3293; G06F 1/3296; G06F 1/3237; G06F 1/3243

USPC ................ 323/282–285, 304, 311–317, 351, 323/222–226, 266–276; 363/65–72; 713/300–340; 327/538–543; 307/11–43, 57, 58, 64–66, 80–87

See application file for complete search history.

(56) References Cited

U.S. PATENT DOCUMENTS

| | | | |
|---|---|---|---|
| 6,177,788 B1 | 1/2001 | Narendra et al. | |
| 6,424,128 B1 * | 7/2002 | Hiraki et al. | 323/268 |
| 6,507,523 B2 | 1/2003 | Pekny | |
| 6,798,275 B1 | 9/2004 | Le et al. | |
| 7,049,797 B2 * | 5/2006 | Fukui et al. | 323/281 |
| 7,995,047 B2 | 8/2011 | Mizuki et al. | |
| 2003/0151957 A1 | 8/2003 | Pekny | |
| 2004/0042319 A1 | 3/2004 | Lee | |

(Continued)

OTHER PUBLICATIONS

US Non-Final Office Action in U.S. Appl. No. 13/603,155, dated Sep. 12, 2014, 17 pages.

(Continued)

*Primary Examiner* — Timothy J Dole
*Assistant Examiner* — Carlos Rivera-Perez
(74) *Attorney, Agent, or Firm* — Fish & Richardson P.C.

(57) ABSTRACT

A microcontroller system includes a main voltage regulator and a low power voltage regulator having a static current consumption less than the static current consumption of the main voltage regulator. A power state controller enables the low power voltage regulator during a power saving mode. On exiting the power saving mode, the power state controller enables the main voltage regulator and disables the low power voltage regulator after determining that the main voltage regulator is ready. The switching circuitry can be asynchronous.

22 Claims, 4 Drawing Sheets

(56) References Cited

U.S. PATENT DOCUMENTS

| | | | |
|---|---|---|---|
| 2006/0255781 A1* | 11/2006 | Itoh | 323/280 |
| 2007/0079147 A1 | 4/2007 | Pyeon et al. | |
| 2008/0024204 A1 | 1/2008 | Choy et al. | |
| 2008/0136381 A1 | 6/2008 | Yang et al. | |
| 2008/0284402 A1* | 11/2008 | Ishino | 323/284 |
| 2009/0044034 A1* | 2/2009 | Wong et al. | 713/330 |
| 2011/0055594 A1 | 3/2011 | Wu | |
| 2012/0194151 A1* | 8/2012 | Gunther | G05F 1/56 323/282 |
| 2015/0009772 A1 | 1/2015 | Chen et al. | |

OTHER PUBLICATIONS

US Final Office Action in U.S. Appl. No. 13/603,155, dated Jan. 16, 2015, 19 pages.

US Non-Final Office Action in U.S. Appl. No. 13/798,991, dated May 15, 2015, 12 pages.

US Non-Final Office Action in U.S. Appl. No. 13/603,155, dated Sep. 10, 2015, 22 pages.

* cited by examiner

DUAL REGULATOR SYSTEMS

CROSS-REFERENCE TO RELATED APPLICATIONS

This application is the utility application of and claims the benefit and priority of U.S. Provisional Application Ser. No. 61/676,710 filed on Jul. 27, 2012, the entire contents of which are hereby incorporated by reference.

TECHNICAL FIELD

This disclosure relates generally to electronics and more particularly to voltage regulators.

BACKGROUND

A voltage regulator provides a regulated output voltage. For example, a voltage regulator can receive a voltage from a potentially unstable power supply and output a substantially constant lower voltage, which is useful for, e.g., digital circuits requiring a substantially constant voltage. In systems on a chip, the current drawn by the voltage regulator can become a significant contributor to the total power drawn by the chip in a power saving mode. Even though the core logic may not be operating in a power saving mode, the voltage regulator continues to draw current, and may be needed by certain components that continue operating in a power saving mode.

SUMMARY

A microcontroller system includes a main voltage regulator and a low power voltage regulator having a static current consumption less than the static current consumption of the main voltage regulator. A power state controller enables the low power voltage regulator during a power saving mode. On exiting the power saving mode, the power state controller enables the main voltage regulator and disables the low power voltage regulator after determining that the main voltage regulator is ready. The switching circuitry can be asynchronous.

Particular implementations of the testing circuit can provide one or more of the following advantages: 1) the system can use less power in power saving mode by switching to a low power voltage regulator; 2) the system need not use or activate a clock in order to switch from a main voltage regulator to a low power voltage regulator, which can reduce power usage both during the power saving mode and while entering and exiting the power saving mode.

The details of one or more disclosed implementations are set forth in the accompanying drawings and the description below. Other features, aspects, and advantages will become apparent from the description, the drawings and the claims.

DETAILED DESCRIPTION

Example Microcontroller System

Figure 1:
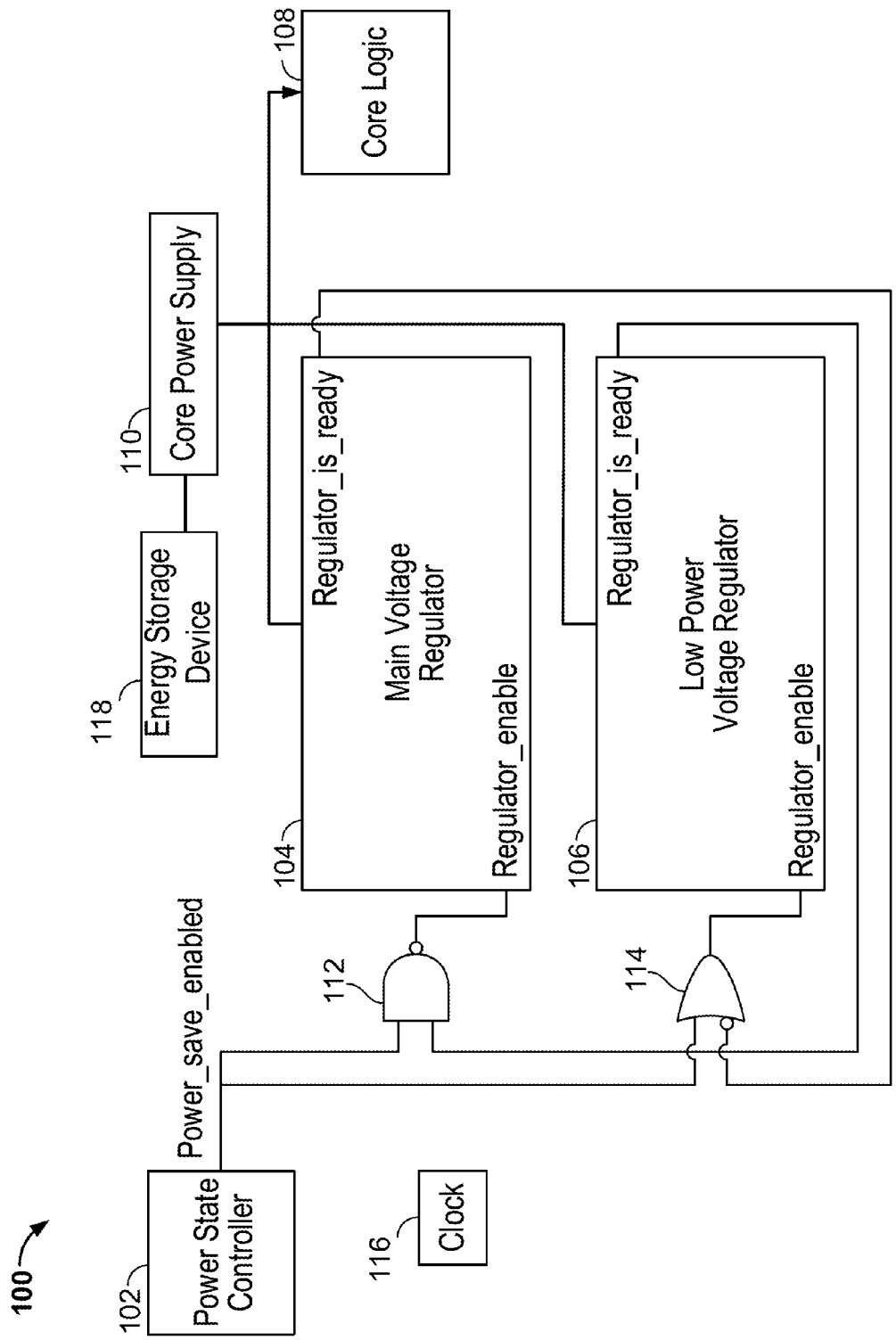
FIG. 1 is a schematic diagram of an example microcontroller system.

FIG. 1 is a schematic diagram of an example microcontroller system 100. The system includes a power state controller 102, a main voltage regulator 104, a low power voltage regulator, a core logic module 108, and a core power supply 110.

The main voltage regulator is coupled to the core power supply and the core logic. The main voltage regulator is configured to provide a regulated voltage from the core power supply to the core logic. The low power supply is also coupled to the core power supply and the core logic, and the low power supply is configured to provide the regulated voltage from the core power supply to the core logic.

The low power voltage regulator has a low static current consumption less than a main static current consumption of the main voltage regulator. Typically, the low power voltage regulator will have a low current capability less than a main current capability of the main voltage regulator. For example, the lower power voltage regulator can have the lower static current consumption by virtue of having a smaller output buffer than the main voltage regulator, which generally also results in a lower current capability. As another example, the lower power voltage regulator can have the lower static current consumption by virtue of biasing circuitry within the lower power voltage regulator.

The power state controller is coupled to the main voltage regulator and the low power voltage regulator. The power state controller is configured to enable the low power voltage regulator during a power saving mode of the microcontroller. On exiting the power saving mode, the power state controller enables the main voltage regulator and, after determining that the main voltage regulator is ready, disables the main voltage regulator.

When the system is not in the power saving mode, the system can consume a large current in fulfilling the system's specifications. When the system is in the power saving mode, the system will generally not draw as much current. For example, some systems can draw a few micro amperes in a superficial power saving mode, or several hundreds of nano amperes in a deep power saving mode. In these power saving modes, a voltage regulator with a high current capability and a high static current consumption can become a significant contributor to the overall static current consumption of the system.

Hence, the system can save additional power during the power saving mode by switching to the low power voltage regulator while in the power saving mode and disabling the main voltage regulator so that it does not draw any substantial static current. The system can save even more power by using asynchronous switching circuitry. For example, the system as illustrated in FIG. 1 does not require the activation of a clock 116 in order to perform the switch from the main voltage regulator to the low power voltage regulator, or to perform the switch from the low power regulator to the main voltage regulator when exiting the power saving mode.

The system includes, as an example of asynchronous circuitry, a NAND gate 112 and an OR gate 114 with an inverted input. The power state controller outputs a Power_save_enabled signal to one of the inputs of the NAND gate and the non-inverted input of the OR gate. The power state controller drives the Power_save_enable signal high when the system is entering the power saving mode and low when the system is exiting the power saving mode.

The other input of the NAND gate is coupled to a ready output of the low power voltage regulator, and the output of the NAND gate is coupled to an enable input on the main voltage regulator. The low power voltage regulator drives the Regulator_is ready signal high when the low power voltage regulator is ready. The main voltage regulator begins to start up when the Regulator_enable signal on the enable input of the main voltage regulator goes high.

The inverted input of the OR gate is coupled to a ready output of the main power voltage regulator, and the output of the OR gate is coupled to an enable input on the low power voltage regulator. The main voltage regulator drives the Regulator_is_ready signal high when the main voltage regulator is ready. The low power voltage regulator begins to start up when the Regulator_enable signal on the enable input of the low power voltage regulator goes high.

The system optionally includes an energy storage device 118. The energy storage device can be, for example, a decoupling capacitor coupled between the core supply and ground, or a battery. The system can include a decoupling capacitor to filter the main voltage regulator's output, and that same decoupling capacitor can also be used for energy storage. The energy storage device can be used to provide power to the core logic in addition to power from the low voltage regulator while the system is exiting a power saving mode.

Example Timing Diagram

Figure 2:
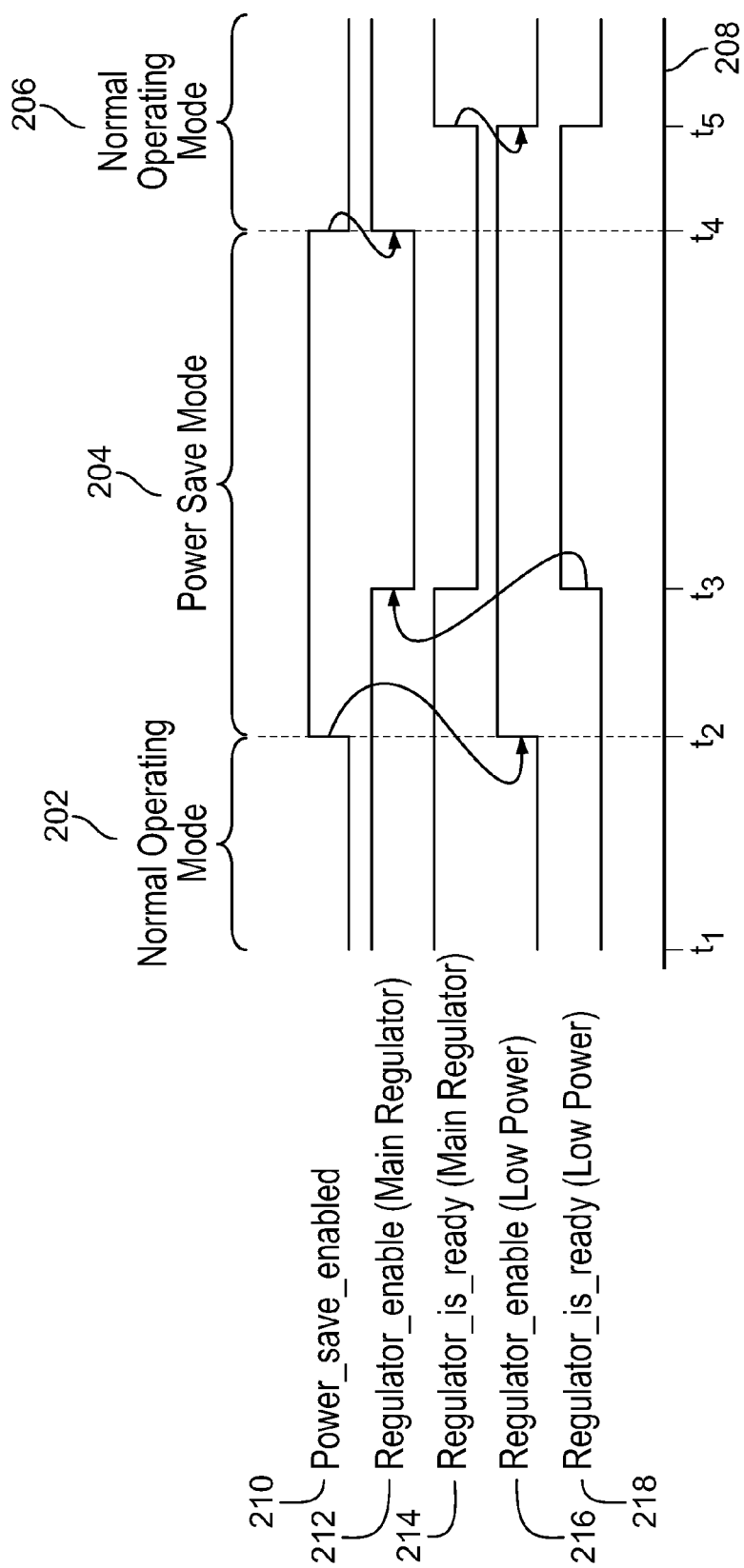
FIG. 2 is an example timing diagram illustrating the operation of the system of FIG. 1.

FIG. 2 is an example timing diagram illustrating the operation of the system 100 of FIG. 1. A timeline 208 illustrates various points in time during the operation of the system.

At time t1, the system is in a normal operating mode 202. The main voltage regulator is providing a regulated voltage to the core logic and the low power voltage regulator is disabled. The Power_save_enabled signal 210 is low, the Regulator_enable signal 212 of the main voltage regulator is high, the Regulator_is_ready 214 signal of the main voltage regulator is high, the Regulator_enable signal 216 of the low power voltage regulator signal is low, and the Regulator_is_ready 218 signal of the low power voltage regulator is low.

At time t2, the system enters the power saving mode 204, and the power state controller drives the Power_save_enabled signal high. The Regulator_enable signal of the low power voltage regulator is also driven high, so the low power voltage regulator begins to start up. There is typically a time between when the low power voltage regulator begins to start up and when it is ready, e.g., due to charging of an inductor or other circuit element. During that time, the low power voltage regulator and the main voltage regulator can concurrently provide the regulated voltage to the core logic.

At time t3, the low power voltage regulator drives the Regulator_is ready signal high. This results in the Regulator_enable signal for the main voltage regulator going low, disabling the main voltage regulator and causing the Regulator_is_ready signal for the main voltage regulator go low.

At time t4, the system exits the power saving mode and reenters the normal operating mode 206. The power state controller drives the Power_save_enabled signal low, resulting in the Regulator_enable signal for the main voltage regulator going high. The main voltage regulator begins to start up. There is typically a time between when the main voltage regulator begins to start up and when it is ready, e.g., due to charging of a capacitor or other circuit element. During that time, the low power voltage regulator and the main voltage regulator can concurrently provide the regulated voltage to the core logic. An optional energy storage device can provide additional power to the core logic to assist the low power voltage regulator.

At time t5, the main voltage regulator drives the Regulator_is_ready signal high. This results in the Regulator_enable signal for the low power voltage regulator going low, disabling the low power voltage regulator and causing the Regulator_is_ready signal for the low power voltage regulator to go low.

Example Operation Flowchart-Entering Power Saving Mode

Figure 3:
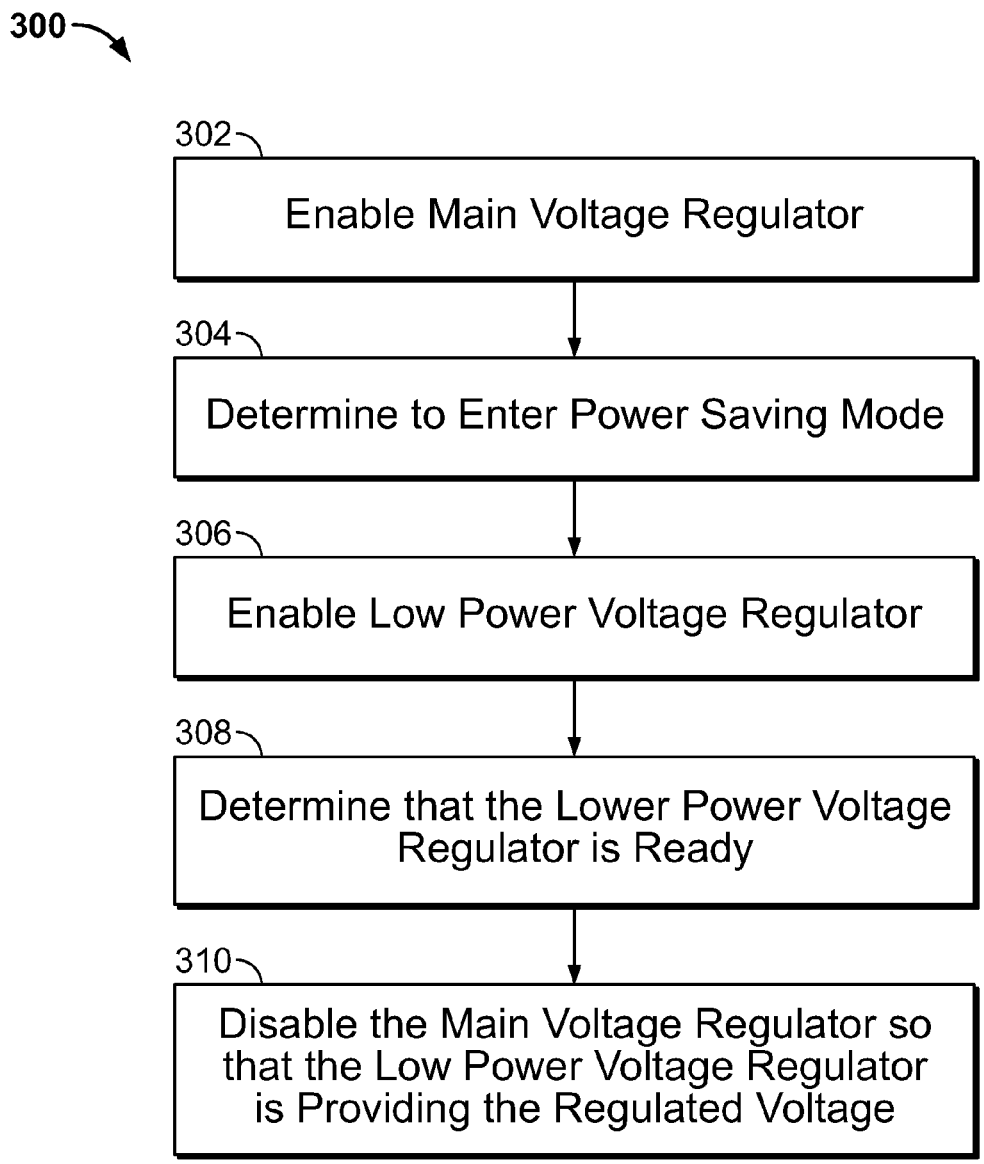
FIG. 3 is a flow diagram of an example process performed by a power state controller for entering a microcontroller system into a power saving mode.

FIG. 3 is a flow diagram of an example process 300 performed by a power state controller for entering a microcontroller system into a power saving mode. The system can be the example system 100 of FIG. 1.

The power state controller enables a main voltage regulator (302). The main voltage regulator is coupled to a core power supply of the system and a core logic of the system. The main voltage regulator is providing a regulated voltage to the core logic.

The power state controller determines to enter a power saving mode (304). For example, the power state controller can receive a request to enter the power saving mode from user circuitry.

The power state controller enables a low power voltage regulator (306). For example, the power state controller can provide an enable signal to the low power voltage regulator. The power state controller can provide the enable signal without waiting for a clock signal to rise or fall. The low power voltage regulator has a low static current consumption less than a main static current consumption of the main voltage regulator. The low power voltage regulator can have a low current capability less than a main current capability of the main voltage regulator.

The low power voltage regulator is coupled to the core power supply and the core logic. In some implementations, both the low power voltage regulator and the main voltage regulator are providing the regulated voltage to the core logic during a time between enabling the low power voltage regulator and determining that the low power voltage regulator is ready.

The power state controller determines that the low power voltage regulator is ready (308). For example, the power state controller can receive a ready signal from the low power voltage regulator. In the example system of FIG. 1, the power state controller includes a NAND gate 112 and an OR gate 114 with an inverted input to implement this feature.

As a consequence of determining that the low power voltage regulator is ready, the power state controller disables the main voltage regulator so that the low power voltage regulator is providing the regulated voltage to the core logic (310).

Example Operation Flowchart-Exiting Power Saving Mode

Figure 4:
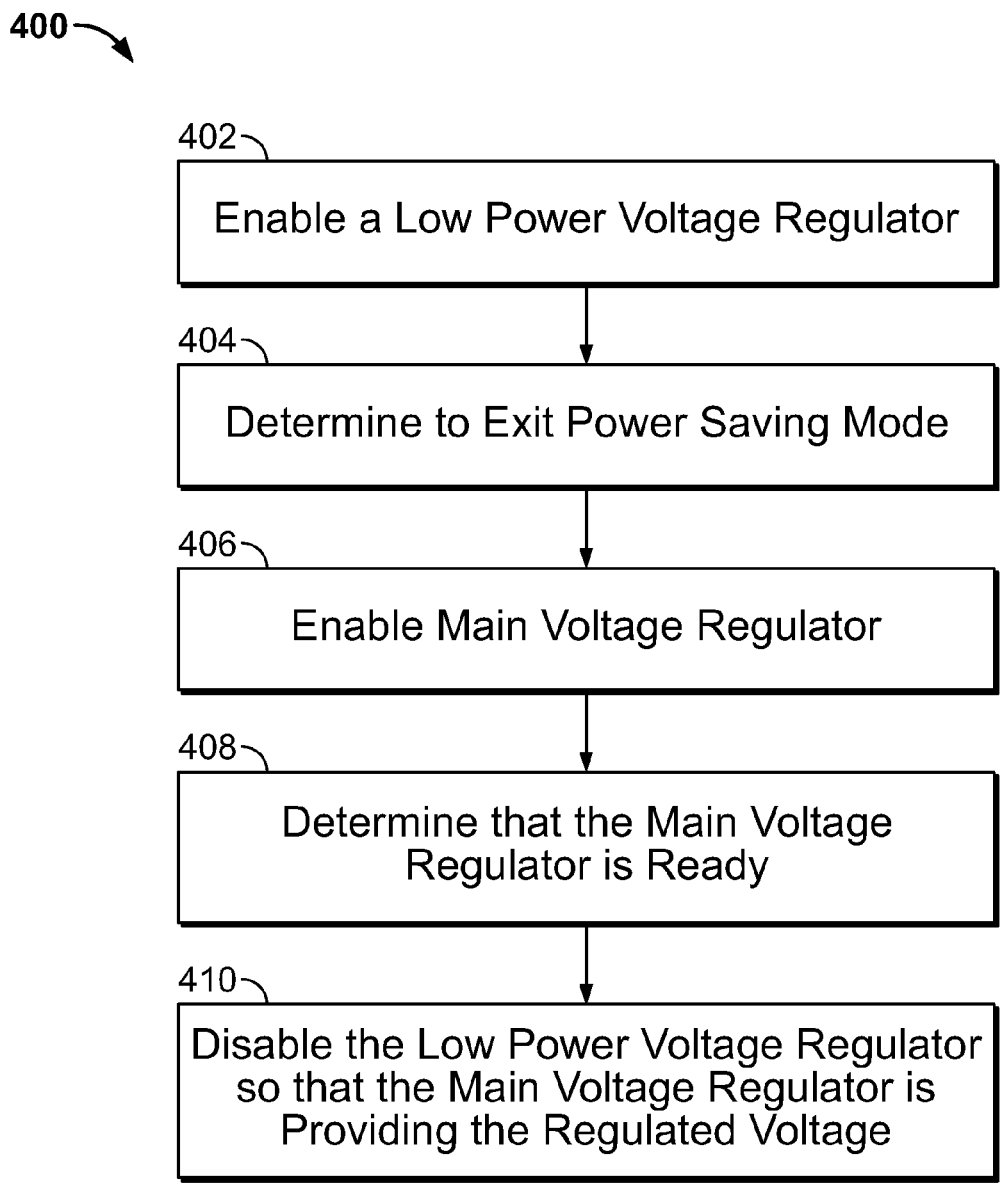
FIG. 4 is a flow diagram of an example process performed by a power state controller for exiting a power saving mode for a microcontroller system.

FIG. 4 is a flow diagram of an example process 400 performed by a power state controller for exiting a power saving mode for a microcontroller system. The system can be the example system 100 of FIG. 1.

The power state controller enables a low power voltage regulator (402). The low power voltage regulator is coupled to a core power supply of the system and a core logic of the system. The low power voltage regulator is providing a regulated voltage to the core logic.

The power state controller determines to exit a power saving mode (404). For example, the power state controller can receive a request to exit the power saving mode from user circuitry.

The power state controller enables a main voltage regulator (406). For example, the power state controller can provide an enable signal to the main voltage regulator. The power state controller can provide the enable signal without waiting for a clock signal to rise or fall. The low power voltage regulator has a low static current consumption less than a main static current consumption of the main voltage regulator. The low power voltage regulator can have a low current capability less than a main current capability of the main voltage regulator.

The main voltage regulator is coupled to the core power supply and the core logic. In some implementations, both the low power voltage regulator and the main voltage regulator are providing the regulated voltage to the core logic during a time between enabling the main voltage regulator and determining that the main voltage regulator is ready. In some implementations, the power state controller provides an additional voltage to the core logic from an energy storage unit during a time between enabling the main voltage regulator and determining that the main voltage regulator is ready.

The power state controller determines that the main voltage regulator is ready (408). For example, the power state controller can receive a ready signal from the main voltage regulator. In the example system of FIG. 1, the power state controller includes a NAND gate 112 and an OR gate 114 with an inverted input to implement this feature.

As a consequence of determining that the main voltage regulator is ready, the power state controller disables the low power voltage regulator so that the main voltage regulator is providing the regulated voltage to the core logic (410).

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method performed by a power state controller of a microcontroller system, the method comprising:
    enabling a main voltage regulator, the main voltage regulator being coupled to a core power supply of the microcontroller system and a core logic of the microcontroller system, the main voltage regulator providing a regulated voltage to the core logic;
    determining to enter a power saving mode;
    enabling a low power voltage regulator by using an enable signal from the power state controller, the low power voltage regulator having a low static current consumption less than a main static current consumption of the main voltage regulator, the low power voltage regulator being coupled to the core power supply and the core logic;
    receiving, by circuitry of the power state controller, a ready signal from the low power voltage regulator and the enable signal from the power state controller; and
    disabling the main voltage regulator by an output signal from the circuitry that is based on the enable signal from the power state controller and the ready signal from the low power voltage regulator so that the low power voltage regulator provides the regulated voltage to the core logic,
    wherein the circuitry comprises a first logic gate and a second logic gate,
    wherein disabling the main voltage regulator comprises providing the enable signal to a first input of the first logic gate and the ready signal to a second input of the first logic gate and providing the output signal from a first output of the first logic gate to the main voltage regulator, and
    wherein enabling a low power voltage regulator comprises providing the enable signal to a third input of the second logic gate and a second ready signal from the main voltage regulator to a fourth input of the second logic gate and providing a second output signal from a second output of the second logic gate to the low power voltage regulator.

2. The method of claim 1, wherein both the low power voltage regulator and the main voltage regulator are providing the regulated voltage to the core logic during a time between enabling the low power voltage regulator and determining that the low power voltage regulator is ready.

3. The method of claim 1, wherein the low power voltage regulator has a low current capability less than a main current capability of the main voltage regulator.

4. The method of claim 1, wherein the low power voltage regulator is configured to start up after receiving the enable signal from the power state controller and to provide the ready signal when the low power voltage regulator has completed starting up.

5. The method of claim 1, wherein enabling the low power voltage regulator comprises providing the enable signal without waiting for a clock signal to rise or fall.

6. A method performed by a power state controller of a microcontroller system, the method comprising:
    determining to exit a power saving mode, wherein, during the power saving mode, a low power voltage regulator is providing a regulated voltage to a core logic of the microcontroller system, the low power voltage regulator being coupled to a core power supply of the microcontroller system and the core logic;
    enabling a main voltage regulator by using an enable signal from the power state controller, the main voltage regulator being coupled to the core power supply and the core logic, the main voltage regulator having a main static current consumption higher than a low static current consumption of the low power voltage regulator;
    receiving, by circuitry of the power state controller, a ready signal from the main voltage regulator and the enable signal from the power state controller; and
    disabling the low power voltage regulator by an output signal from the circuitry that is based on the enable signal from the power state controller and the ready signal from the main voltage regulator so that the main voltage regulator provides the regulated voltage to the core logic,
    wherein the circuitry comprises a first logic gate and a second logic gate,
    wherein disabling the low power voltage regulator comprises providing the enable signal to a first input of the first logic gate and the ready signal to a second input of the first logic gate and providing the output signal from a first output of the first logic gate to the low power voltage regulator; and
    wherein enabling a main voltage regulator comprises providing the enable signal to a third input of the second logic gate and a second ready signal from the low power voltage regulator to a fourth input of the second logic gate and providing a second output signal from a second output of the second logic gate to the main voltage regulator.

7. The method of claim 6, further comprising providing an additional voltage to the core logic from an energy storage unit during a time between enabling the main voltage regulator and determining that the main voltage regulator is ready.

8. The method of claim 6, wherein the low power voltage regulator has a low current capability less than a main current capability of the main voltage regulator.

9. The method of claim 6, wherein enabling the main voltage regulator comprises providing the enable signal without waiting for a clock signal to rise or fall.

10. A system comprising:
a core logic;
a main voltage regulator coupled to the core logic;
a low power voltage regulator coupled to the core logic, the low power voltage regulator configured to have a low static current consumption less than a main static current consumption of the main voltage regulator; and
a power state controller comprising circuitry coupled to the main voltage regulator and the low power voltage regulator, the circuitry configured to receive a ready signal from the low power voltage regulator,
wherein the power state controller is configured to:
enabling the low power voltage regulator using an enable signal from the power state controller, and
disable the main voltage regulator by an output signal from the circuitry that is based on the enable signal from the power state controller and the ready signal from the low power voltage regulator,
wherein the circuitry comprises:
a first logic gate including a first input coupled to the power state controller, a second input coupled to a ready output of the low power voltage regulator, and a first output coupled to an enable input of the main voltage regulator; and
a second logic gate including a third input coupled to the power state controller, a fourth input coupled to a ready output of the main voltage regulator, and a second output coupled to an enable input of the low power voltage regulator.

11. The system of claim 10, wherein the low power voltage regulator has a low current capability less than a main current capability of the main voltage regulator.

12. The system of claim 10, further comprising an energy storage unit configured to provide an additional voltage to the core logic during a time between enabling the main voltage regulator and determining that the main voltage regulator is ready.

13. The system of claim 12, wherein the energy storage unit is a decoupling capacitor.

14. The system of claim 10, wherein the main voltage regulator and the low voltage regulator are configured to concurrently supply a regulated voltage to the core logic during a time between enabling the main voltage regulator and determining that the main voltage regulator is ready.

15. The system of claim 10, wherein the main voltage regulator and the low power voltage regulator are configured to concurrently supply a regulated voltage to the core logic during a time between enabling the low power voltage regulator and determining that the low power voltage regulator is ready.

16. The system of claim 10, wherein the power state controller is configured to initiate a power saving mode, and the circuitry is further configured to disable the main voltage regulator based at least in part on the initiation of the power saving mode.

17. The system of claim 10, wherein the power state controller is configured to:
enable the low power voltage regulator by using the enable signal from the power state controller and a second ready signal from the main voltage regulator during the power saving mode and disable the main voltage regulator by using the enable signal from the power state controller and the ready signal from the low power voltage regulator after determining that the low power voltage regulator is ready; and
on exiting the power saving mode, enable the main voltage regulator by using a second enable signal from the power state controller and the ready signal from the low power voltage regulator and disable the low power voltage regulator by using the second enable signal from the power state controller and the second ready signal from the main voltage regulator after determining that the main voltage regulator is ready.

18. The system of claim 17, wherein the power state controller is configured to determine that the low power voltage regulator is ready by determining that the circuitry receives the ready signal from the low power voltage regulator and determine that the main voltage regulator is ready by determining that the circuitry receives the second ready signal from the main voltage regulator.

19. The system of claim 18, wherein the main voltage regulator comprises a ready output and an enable input, wherein the main voltage regulator is configured to start up after receiving the second enable signal on the enable input from the power state controller, and wherein the main voltage regulator is configured to provide the second ready signal on the ready output when the main voltage regulator has completed starting up.

20. The system of claim 10, wherein the low power voltage regulator is configured to start up after receiving the enable signal on the enable input from the power state controller, and wherein the low power voltage regulator is configured to provide the ready signal on the ready output when the low power voltage regulator has completed starting up.

21. The system of claim 10, wherein the power state controller provides the enable signal to the first input of the first logic gate and the second input of the second logic gate, and
wherein the power state controller enables the low power voltage regulator when the power state controller drives the enable signal high, and the power state controller enables the main voltage regulator when the power state controller drives the enable signal low.

22. The system of claim 21, wherein the first logic gate is an NAND logic gate and the second logic gate is an OR gate, and wherein the third input of the OR gate is a non-inverted input and the fourth input of the OR gate is an inverted input.

* * * * *